United States Patent [19]

Ito et al.

[11] Patent Number: 5,933,253
[45] Date of Patent: Aug. 3, 1999

[54] COLOR AREA COMPRESSION METHOD AND APPARATUS

[75] Inventors: Masahiko Ito, Tokyo; Naoya Katoh, Chiba, both of Japan

[73] Assignee: Sony Corporation, Japan

[21] Appl. No.: 08/719,448

[22] Filed: Sep. 25, 1996

[30] Foreign Application Priority Data

Sep. 29, 1995 [JP] Japan .................................. 7-254242

[51] Int. Cl.[6] .............................. H04N 1/46; G03F 3/08
[52] U.S. Cl. ...................... 358/500; 358/500; 358/518; 358/515; 358/501
[58] Field of Search ................................ 358/518, 501, 358/515, 530, 500

[56] References Cited

U.S. PATENT DOCUMENTS 5,363,218  11/1994  Hoshino .................... 358/518
5,734,745   3/1998  Ohneda .................... 358/518

Primary Examiner—Edward L. Coles
Assistant Examiner—Twyler Lamb
Attorney, Agent, or Firm—Rader, Fishman & Grauer; Ronald P. Kananen

[57] ABSTRACT

A gamut compression method and apparatus for a color DTP system in which more natural-looking color regeneration is achieved in consideration of the difference in gamut from one device to another. If the gamut of the output system GMout is smaller than that of the input system GMin, the gamut of the input system is divided into four portions in a two-dimensional plane of lightness and chroma, under a constant color hue, using two straight line segments, and gamut compression is done by varying the compressing direction for each area, so that the color in the gamut of the input system will be converted into the color in the gamut of the output system.

10 Claims, 9 Drawing Sheets

(FOR $C^*\_th = C^*\_max \times K[const]$)

RESULT OF EXPERIMENT (CG 1)

RESULT OF EXPERIMENT (CG 2)

COLOR AREA COMPRESSION METHOD AND APPARATUS

BACKGROUND OF THE INVENTION

1. Field of the Invention

This invention relates to a method and apparatus for color area compression of color video data which may be applied with advantage to, for example, a desk top publishing (DTP) system centered about a work station.

2. Description of the Related Art

In general, the color range, that is a color reproducing range or gamut, of a device handling a color image, differs from device to device. Since a monitor achieves color reproduction by additive mixing by coloration of three prime colors of red (R), green (G) and blue (B), the color gamut of the monitor is determined by the types of the fluorescent material employed. On the other hand, a printer reproduces the color by the cyan (C), magenta (M), yellow (Y) and black (B) of the ink. The color gamut of the printer differs not only with the ink employed but also with the sort of the paper sheet as the image reproducing medium and with the form of gradation representation.

Referring to FIG. 1 showing the result of integration in the direction L* in an a*–b* plane of the color gamut of a monitor of computer graphics (CG) and the color gamut of an ink jet printer, the color gamut $CM_{ijp}3$ of a printer is lower than the color gamut $CM_{mon}$ of the monitor. Above all, color reproducibility of the high chroma area of green (G) and blue (B) is extremely low. As for other color hues, for which no clear distinction can be made in FIG. 1, the peak of chroma is deviated in the direction of lightness. Consequently, color reproducibility from the monitor to the printer is not good especially in high lightness and in high chroma areas.

In a natural picture, high saturation (chroma) color occurs less frequently, while a color closer to unsaturated color is predominant. Since a CG picture is drawn based on a monitor output, colors of high saturation that cannot be regenerated by a printer are frequently used. The result is that the proportion of the colors outside the color gamut is higher in a CG image so that the color reproducibility in the CG image is low as compared to the case of printing a natural picture. Heretofore, a device handling a color picture is used under such an environment that it is connected to a specified input/output device, such as a camera or a monitor handling red (R), green (G) and blue (B) or luminance (Y) and color differences (U), (V) or (I), (Q), or a scanner or a printer handling cyan (C), magenta (M), yellow (Y), black (K) or red (Dr), green (Dg) and blue (Db). Under such environments, closed color correction between the input/output devices is performed, while the technique of color gamut compression can be determined solely by the color range or color gamut of the input/output device.

However, in an environment to which many users connect their various devices, close color correction between the input/output devices cannot be employed.

Thus a demand has been raised for the concept of a device independent color regeneration technique of representing a picture with the similar color regardless of input/output devices types. The system for realization of a device independent color regeneration is generally termed a color management system (CMS).

In CMS, when connecting various input/output devices, such as a camera 61, a scanner 62, a monitor 63 or a printer 64, as shown in FIG. 2, color signals of an input system are converted into color signals of an output system at a time in a device independent common color space, such as CIE/XYZ or CIE/L* a* b* by a conversion formula or a conversion table known as profile.

If, in the CMS, the color gamut of an output system is larger than that of the input system, the picture can be directly outputted so that no problem is incurred. Conversely, if the color gamut of an input system is larger than that of the output system, the color information cannot be directly regenerated correctly, depending on the image type. For example, if an image on a monitor is to be outputted to a printer, the color outside the gamut of the printer cannot be directly regenerated. In such case, such color correction is required in which the original picture information, such as gradation or color hue, is maintained as far as possible and the color outside the gamut is brought into the gamut. The technique of forcing the physically non-reproducible colors into the gamut by some means or other is generally termed gamut compression.

In connection with the color perception by the eyes, the color has three attributes, namely the lightness representing the color lightness, chroma representing the color brightness and color hue representing the color type. The color space which is based upon the three attributes of the color perception of the human being may be exemplified by the CIE/L* C* h color space, where L*, C* and h represent lightness, chroma and color hue, respectively. These three attributes can be handled as independent parameters.

The gamut compression may be performed in the CIE/L* C* h color space for utmost perceptual comprehensibility. The generally accepted practice is to perform color compression in a two-dimensional plane of lightness L and chroma C, with the color hue h being kept constant.

Among conventional techniques for gamut compression, there are a chroma compression method in which lightness L* is kept constant and only chroma C* is compressed, as shown in FIG. 3, a lightness compression method in which chroma C* is kept constant and lightness L* is compressed, and a minimum color difference method of minimizing the color difference in the L*–C* plane, as shown in FIG. 5.

In the conventional chroma compression method, the resulting picture generally lacks vividness, although gradation of the high chroma area is maintained to a limited extent.

In the lightness compression method, while chroma is scarcely lowered, difference in lightness becomes more pronounced the higher becomes the saturation. Since the high lightness area is compressed to a low lightness area and the low lightness area is compressed to a high lightness area, an area shown shaded in FIG. 4 becomes of the same color.

In the minimum color difference method, the color difference becomes minimum, so that a picture mathematically closest to the original color is obtained. However, an area shown shaded in FIG. 5 becomes of the same color.

SUMMARY OF THE INVENTION

It is therefore an object of the present invention to provide a gamut compression method and apparatus whereby more spontaneous color regeneration may be achieved in a color DTP system taking into account the difference in color gamut of respective devices.

According to the present invention, there is provided a method for gamut compression in which, if the gamut of the output system is smaller than that of the input system, the gamut of the input system is divided into four portions in a two-dimensional plane of lightness and chroma, under a constant color hue, using two straight line segments, and gamut compression is done by varying the compressing direction from one area to another, for converting the color in the gamut of the input system into the color in the gamut of the output system.

In a preferred embodiment, the color of the input system is divided into four areas, in a two-dimensional plane of lightness L* and chroma C* of color picture data in the CIE/L* C* h color space, under a constant color phase h, by a first straight line segment traversing the minimum value L*_min of lightness L* of the gamut of the output system and a second straight line segment traversing the maximum value L*_max of lightness L* of the gamut of the output system. The first and second straight line segments intersect each other at a point (C*_th, L*_th) on a lightness value L*_th having the maximum chroma value of C*_max in the gamut of the output system. The color of the first area above the first straight line segment and below the second straight line segment is left as is, while the color of the second area lying above the first and second straight line segments is compressed in the direction of a point (0, L*_min). On the other hand, the color of the third area lying below the first and second straight line segments is compressed in the direction of a point (0, L*_max), while the color of the fourth area lying below the first straight line segment and above the second straight line segment is compressed in the direction of a point (C*_th, L*_th).

DESCRIPTION OF THE PREFERRED EMBODIMENTS

Figure 1:
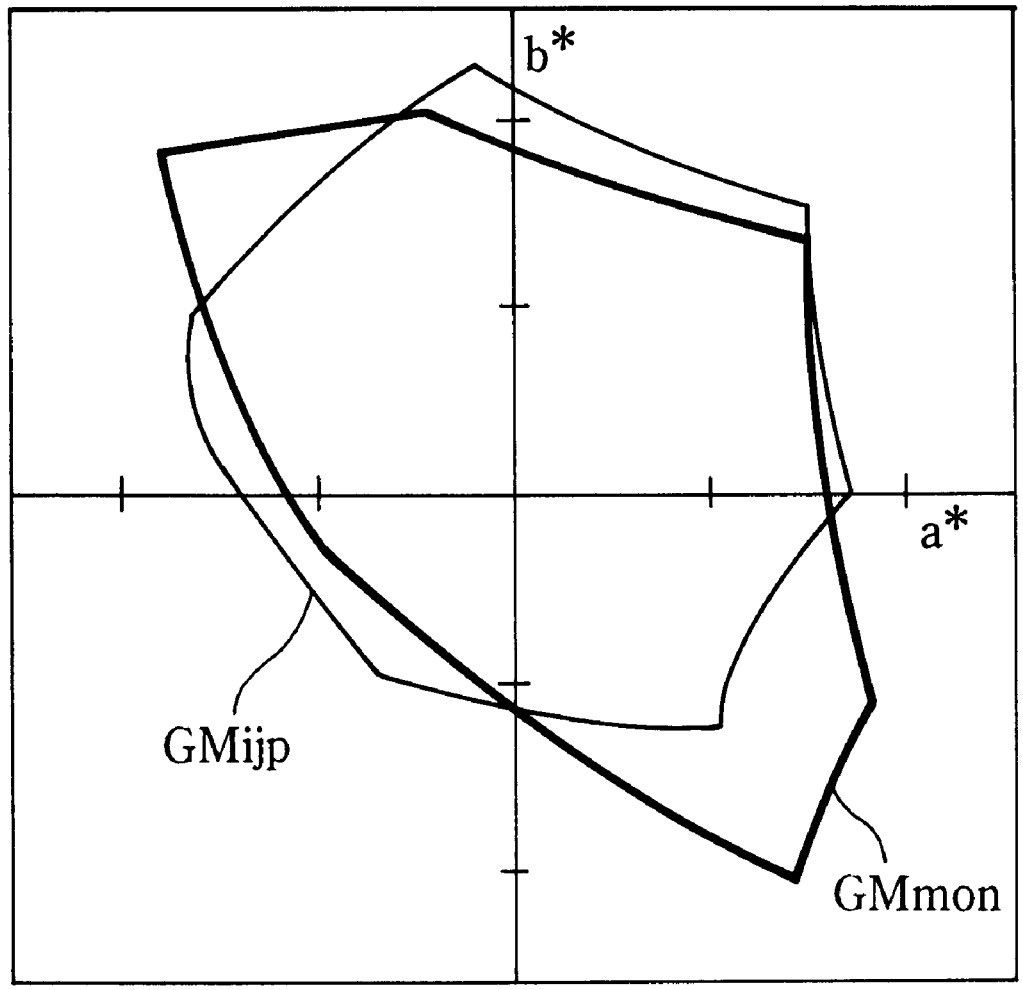
FIG. 1 is a graph showing the results of integration of a color gamut of the CG monitor and a color gamut of an ink jet printer in an L* direction in an a*–b* plane.
Figure 2:
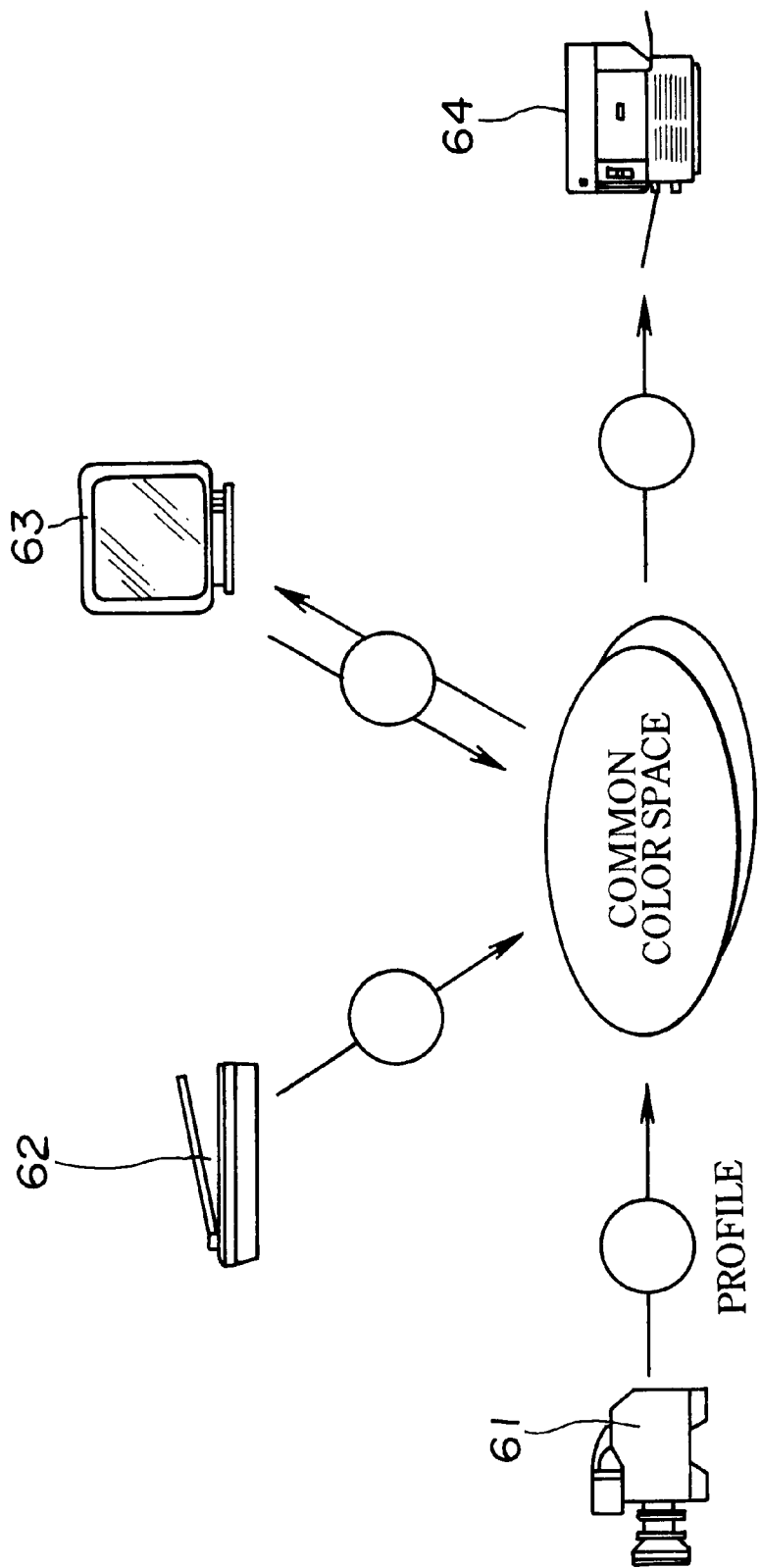
FIG. 2 illustrates a generic color management system.
Figure 3:
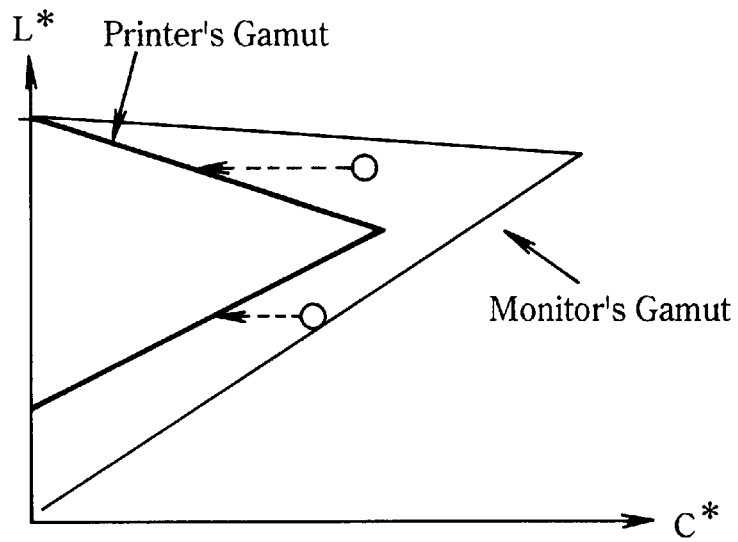
FIG. 3 illustrates the technique of gamut compression by a conventional chroma compression method.
Figure 4:
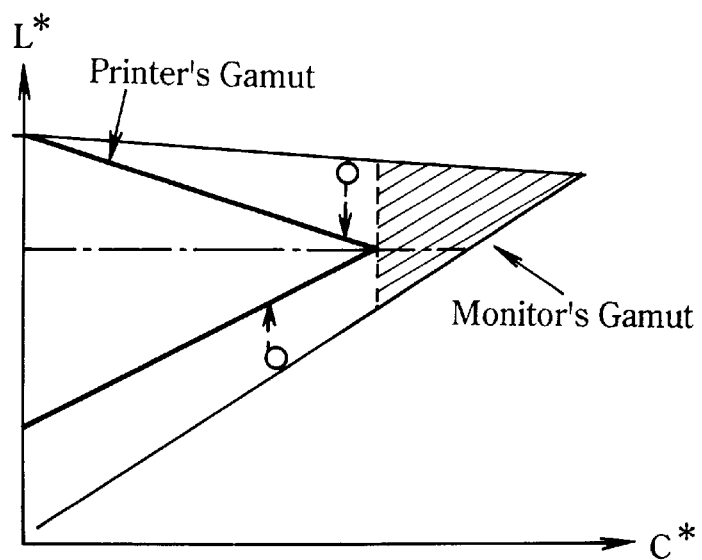
FIG. 4 illustrates the technique of gamut compression by a conventional lightness compression method.
Figure 5:
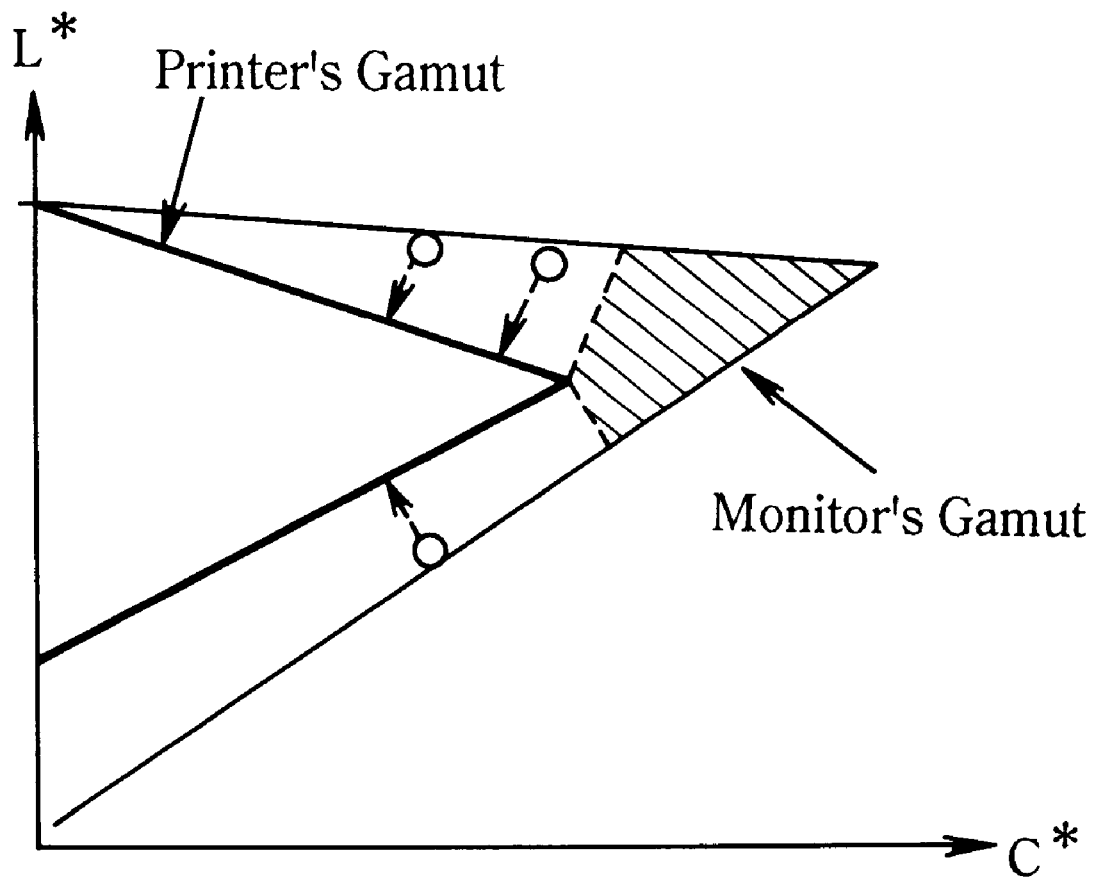
FIG. 5 illustrates the technique of gamut compression by a conventional minimum color difference method.

Referring to the drawings, preferred embodiments of the present invention will be explained in detail.

Figure 6:
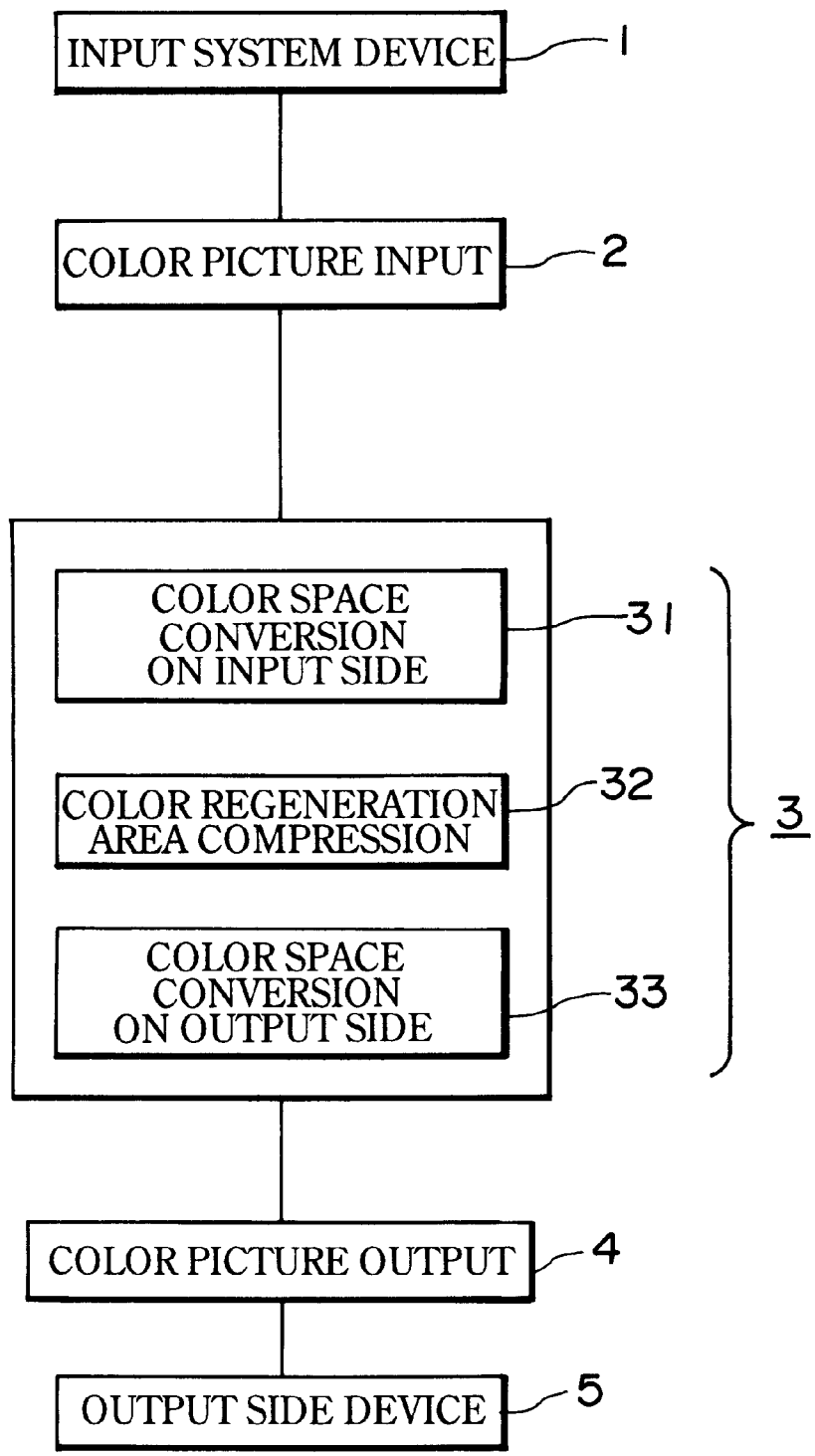
FIG. 6 illustrates a basic arrangement of a color management system CMS embodying the present invention.
Figure 7:
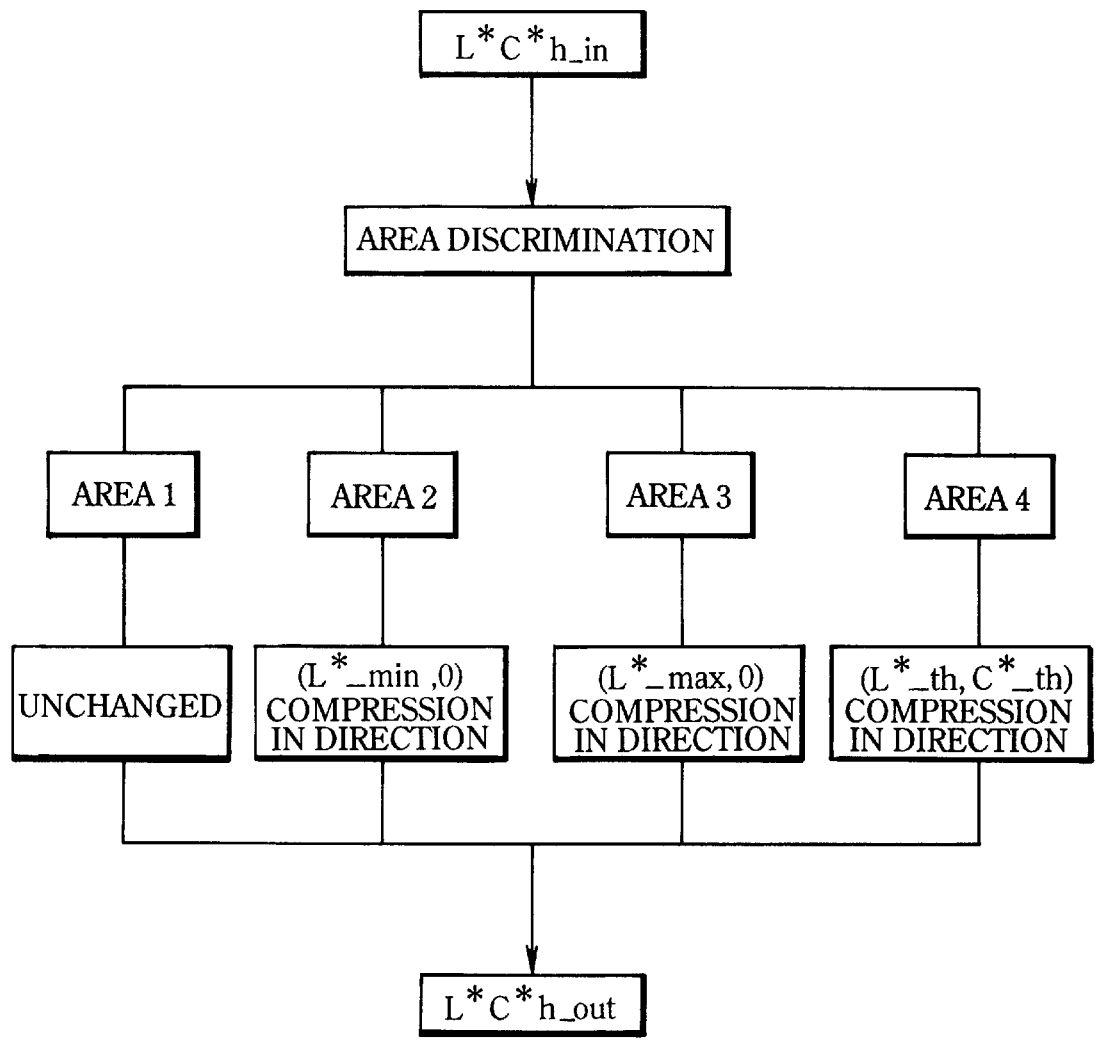
FIG. 7 is a flowchart for illustrating the sequence of gamut compression by a color gamut compression processing by a color gamut processor in the CMS.

The present invention is practiced by a color management system (CMS) configured as shown for example in FIG. 6.

The CMS shown in FIG. 6 is of a basic arrangement made up of an input side device 1, a color picture input unit 2, a picture processor 3, a color picture output unit 4 and an output side device 5. Color picture data are supplied from the input side device 1 via color picture input unit 2 to a picture processor 3 where the color picture data is processed with gamut compression in a common color space. The resulting gamut-compressed color picture data is outputted from the picture processor 3 via the color picture output unit 4 to the output side device 5.

The picture processor 3 is made up of an input side conversion unit 31, a gamut compression processor 32 and an output side conversion unit 33. The input side conversion unit 31 converts the color picture data supplied from the input side device 1 via the color picture input device 2, that is the color picture data of the color space of the input system dependent on the color gamut of the device 1 of the input system, into color picture data of the common color space independent on the color gamut of the input system device 1, for example, the CIE/L* C* h color space. Moreover, the color gamut compression processor 32 performs color gamut compression on the color picture data of the CIE/L* C* h color space supplied via the input side conversion unit 31. The output side conversion unit 33 converts the color picture data of the CIE/L* C* h color space, gamut-compressed by the color gamut compression processor 32, into color picture data of an output system dependent on the color gamut of the device 5 of the output system, and outputs the converted data via the color picture output unit 4 to the output side device 5.

The color gamut compression processor 32 performs gamut compression processing on the color picture data of the CIE/L* C* h color space, supplied via the input side conversion unit 31, in accordance with the sequence of operations indicated in the flowchart of FIG. 6.

Figure 8:
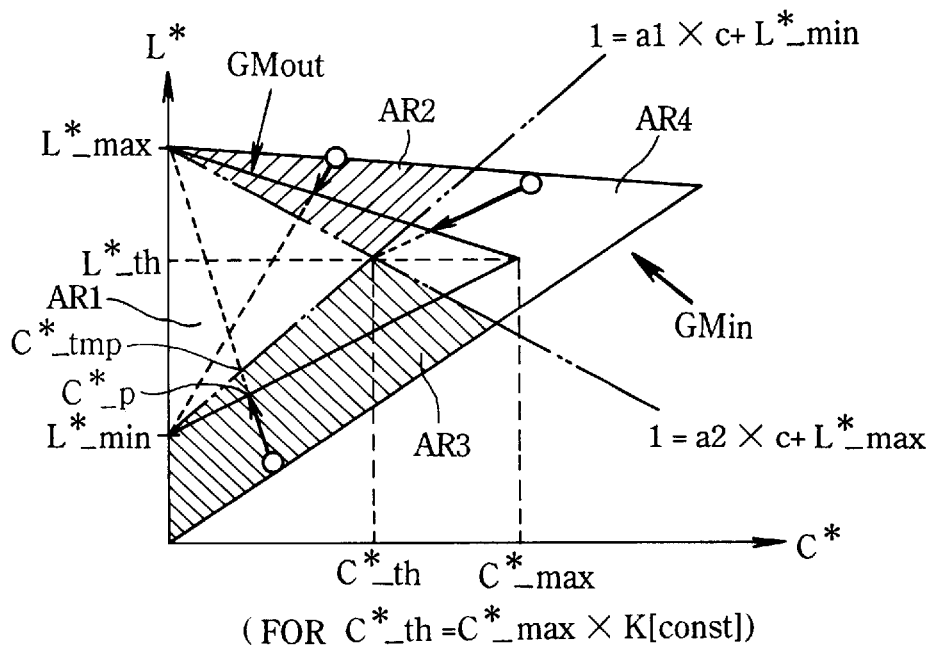
FIG. 8 schematically illustrates an example of color gamut compression processing by the color gamut processor.

That is, the color gamut compression processor 32 divides the gamut GMin of the input system for the color picture data of the CIE/L* C* into four portions, in the two-dimensional plane of the lightness L* and chroma C*, under the constant color phase h, using two straight line segments, as shown in FIG. 8.

One of the two straight line segments traverses the minimum value L*_min of lightness L⁺ of the output system while the other straight line segment traverses the maximum value L*_max of lightness L⁺ of the output system, with the two line segments intersecting each other at a point lying on a lightness value L* th having the maximum value of chroma C*_max.

These two straight line segments may be represented by l=a1×c+L*_min
l=a2×c+L*_max where a1, a2 denote the gradients of the two line segments and may be represented by a1=(L*_th−L*_min)/C*th
a2=(L*_th−L*_max)/C*th where $C^*th$ is a parameter given by $C^*th = c^*\_max \times K$ where K is a constant such that $0 \leq K \leq 1$.

Thus the color gamut GMin of the input system may be divided into the following four portions:

first area AR1: $a1 \times c + L^*\_min \leq 1 \leq a2 \times c + L^*\_max$ second area AR2: $1 \geq a1 \times c + L^*\_min$, $1 \geq a2 \times c + L^*\_max$ third area AR3: $1 \leq a1 \times c + L^*\_min$, $1 \leq a2 \times c + L^*\_max$ fourth area AR4: $a2 \times c + L^*\_max \leq 1 \leq a1 \times c + L^*\_max$ With the value of color picture data converted into the CIE/$L^* C^* h$ color space being set to ($L^*\_in$, $C^*\_in$, $h\_in$), and with the value of the compressed color picture data being set to ($L^*\_out$, $C^*\_out$, $h\_out$), the color gamut compression processor 32 substitutes $1 = L^*\_in$ and $c = C^*\_in$ in the equations for the two straight line segments, for discriminating the area.

Figure 9:
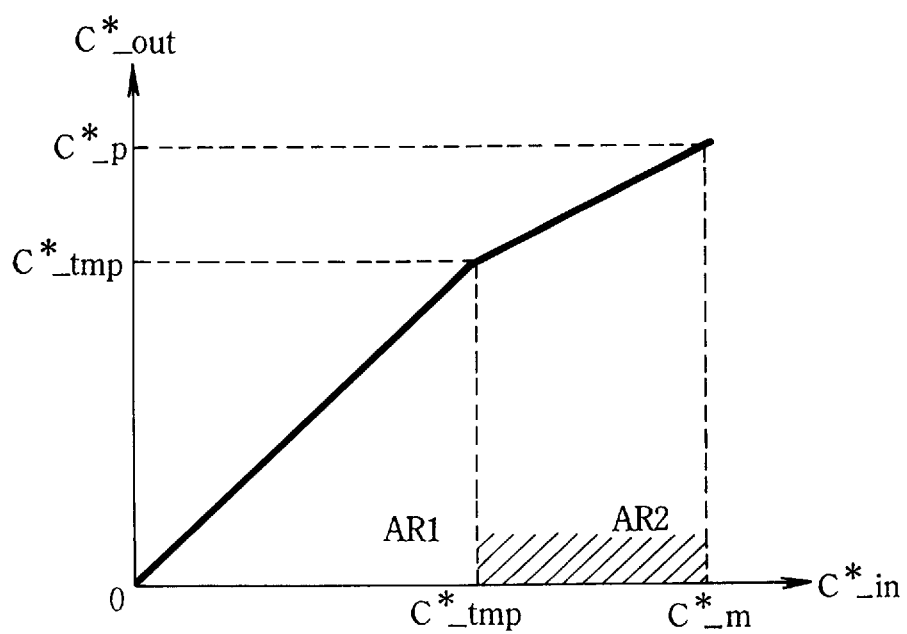
FIG. 9 schematically illustrates the contents of color gamut compression processing on the first and second areas in an example of the color gamut compression processing by the color gamut compression processor.

For the first area AR1, the color gamut compression processor 32 directly uses the values, that is sets so that $L^*\_out = L^*\_in$ $C^*\_out = C^*\_in$ $h\_out = h\_in$ For the second area AR2, the color gamut compression processor 32 performs compression in the direction of a point ($L^*\_min$, 0, h in). In this second area AR2, the compression ratio is increased with increased distance from the gamut GMout of the output system, as shown in FIG. 9. For example, if a straight line segment traversing two points ($L^*\_min$, 0, $h\_in$), ($L^*\_in$, $C^*\_in$, $h\_in$) is considered, and the maximum values of the gamut of the input system and the output system on the straight line are ($L^*\_m$, $C^*$ m, $h\_in$), ($L^*\_p$, $C^*\_p$, $h\_in$), respectively, and the values on the boundary with the first area AR1 are ($L^*\_tmp$, $C^*\_tmp$, $h\_in$), then $L^*\_out = L^*\_tmp + (L^*\_p - L^*\_tmp)/(L^*\_m - L^*\_tmp) \times L^*\_in$ $C^*\_out = C^*\_tmp + (C^*\_p - C^*\_tmp)/(C^*\_m - C^*\_tmp) \times C^*\_in$ $h\_out = h\_in$ For the third area AR3, the color gamut compression processor 32 performs compression in the direction of a point ($L^*\_max$, 0, h in). In this third area AR3, the compression ratio is increased with increased distance from the gamut GMout of the output system. For example, if a straight line segment traversing two points ($L^*$ max, 0, $h\_in$), ($L^*\_in$, $C^*\_in$, $h\_in$) is considered, and the boundary point (maximum value for the chroma) of the gamut of the input system and that of the output system on the straight line are ($L^*\_m$, $C^*\_m$, $h\_in$), ($L^*\_p$, $C^*\_p$, $h\_in$), respectively, and the values on the boundary with the first area AR1 are ($L^*\_tmp$, $C^*$ tmp, $h\_in$), then $L^*\_out = L^*\_tmp + (L^*\_p - L^*\_tmp)/(L^*\_m - L^*\_1\ tmp) \times L^*\_in$ $C^*\_out = C^*\ tmp + (C^*\_p - C^*L\ tmp)/(C^*\_m - C^*\_tmp) \times C^*\ in$ $h\_out = h\_in$ For the fourth area AR3, the color gamut compression processor 32 performs compression in the direction of a point ($L^*\_th$, $C^*\_th$, $h\_in$). In this fourth area AR4, the compression ratio is increased with increased distance from the gamut GMout of the output system. For example, if a straight line segment traversing two points ($L^*$ th, $C^*\_th$, $h\_in$), ($L^*\_in$, $C^*\_in$, $h\_in$) is considered, and the maximum value of the gamut of the input system and that of the output system on the straight line are ($L^*\_m$, $C^*\_m$, $h\_in$), ($L^*$ p, $C^*\_p$, $h\_in$), respectively, then $L^*\_out = L^*\_th + (L^*\_p - L^*\_th)/(L^*\_m - L^*\_th) \times L^*\_1\ in$ $C^*\_out = C^*\_th + (C^*\_p - C^*\ th)/(C^*\_m - C^*\_th) \times C^*\_in$ $h\_out = h\_in$.

By this processing, compression may be done so that chroma will be maintained as far as possible in the high lightness area, that is the second area AR2, and in the high chroma area, that is the fourth area AR4. On the other hand, there is no discontinuity in the threshold caused by area division. Moreover, the lowering in the chroma direction may be minimized by enlarging the parameter K, while changes in the lightness direction may be reduced and the gradation in the high chroma area improved by decreasing the parameter K.

Figure 10:
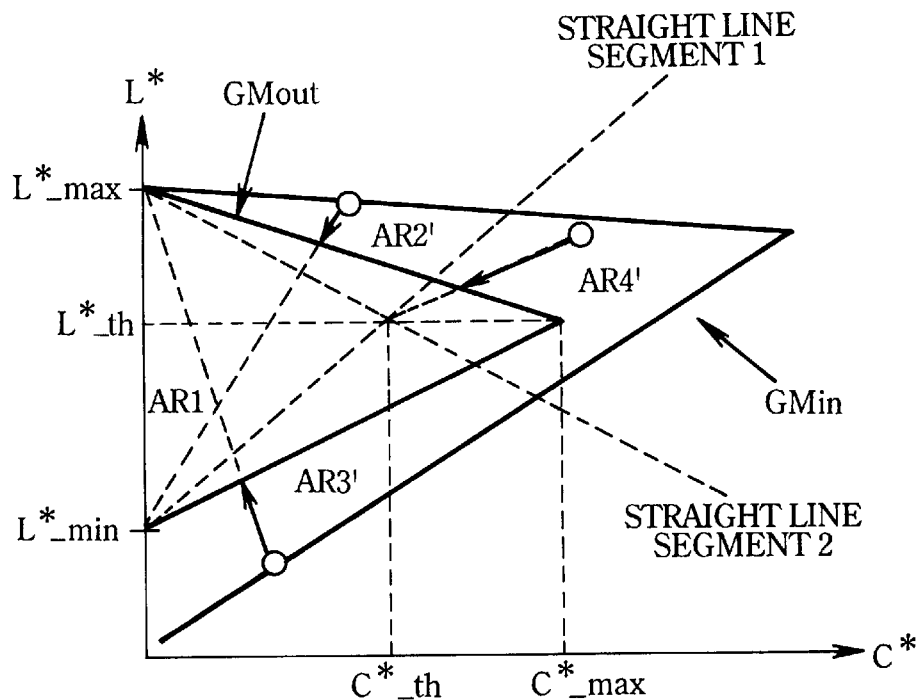
FIG. 10 schematically illustrates another example of color gamut compression processing by the color gamut processor.
Figure 11:
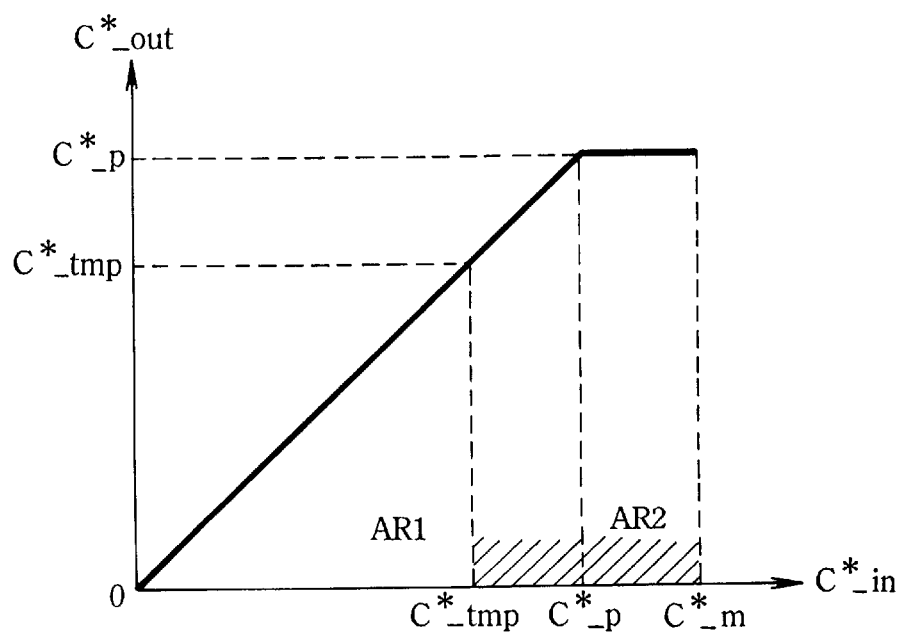
FIG. 11 schematically illustrates the contents of color gamut compression processing on the first and second areas in an other example of the color gamut compression processing by the color gamut compression processor.

In the above embodiment, all colors in the second to fourth areas AR2 to AR4, inclusive of the colors surpassing the gamut GMout of the output system, are compressed into the gamut GMout of the output system. However, it is also possible to compress only the colors of areas AR2', AR3' and AR4' exceeding the gamut GMout of the output system in the above second to fourth areas AR2 to AR4 to the closest colors in the gamut GMout of the output system, as shown for example in FIG. 10.

That is, the color of the first area AR1 is left as is, such that $L^*\_out = L^*\_in$ $C^*\_out = C^*\_in$ $h\_out = h\_in$.

For the second area AR2', compression is done towards a point ($L^*\_min$, 0, $h\_in$). For the third area AR3' and for the fourth area AR4', compression is done in the direction of a point ($L^*$ max, 0, $h\_in$) and in the direction of a point ($L^*\_th$, $C^*\_th$, h in), such that $L^*\_out = L^*\_p$ $C^*\_out = C^*\_p$ $h\_out = h\_in$.

In this case, the gradation becomes of the same color if the direction of convergence coincides. On comparison with the conventional chroma compression method, lightness compression method and with the minimum color difference method by the visual sense test for the CG picture, the results in favor of the present method could be obtained.

The visual sense test was conducted using two sorts of CG images, that is a first image CG1 containing large amounts of yellow and green and a second image CG2 containing large amounts of blue and magenta. As the techniques for gamut compression, the conventional methods, that is the chroma compression (A), lightness compression (B) and the minimum color difference method(C), and the technique shown in FIG. 10 wherein K=0(D), K 0.75(E) and K=1(F), were used. In a dark room not affected by extraneous light, a monitor and a light box were placed in a 90. position centered about 33 panelists of which 19 were male and 14 were female. Two images of different gamut compression techniques, presented on the light box, and an image in the monitor, were presented for comparison to 33 panelists, who were then asked to judge which of the two images were more alike the image on the monitor for all combinations (6×5/2=15 combinations). For the images presented in the light box, an output image of an ink jet printer (A3+, 300 DPI, continuous system) and an output image of a sublimation type printer (A4, 163DPI) were used.

Figure 12:
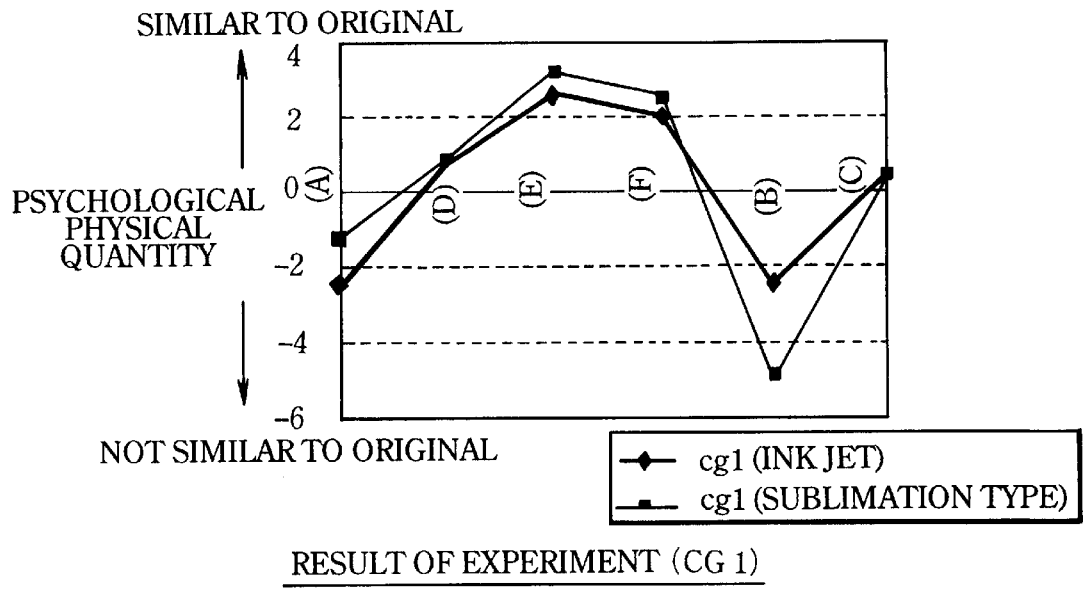
FIG. 12 is a graph showing the results of a visual sense test for comparing the other example of the color gamut compression processing by the color gamut compression processor and various techniques by the conventional chroma compression method.
Figure 13:
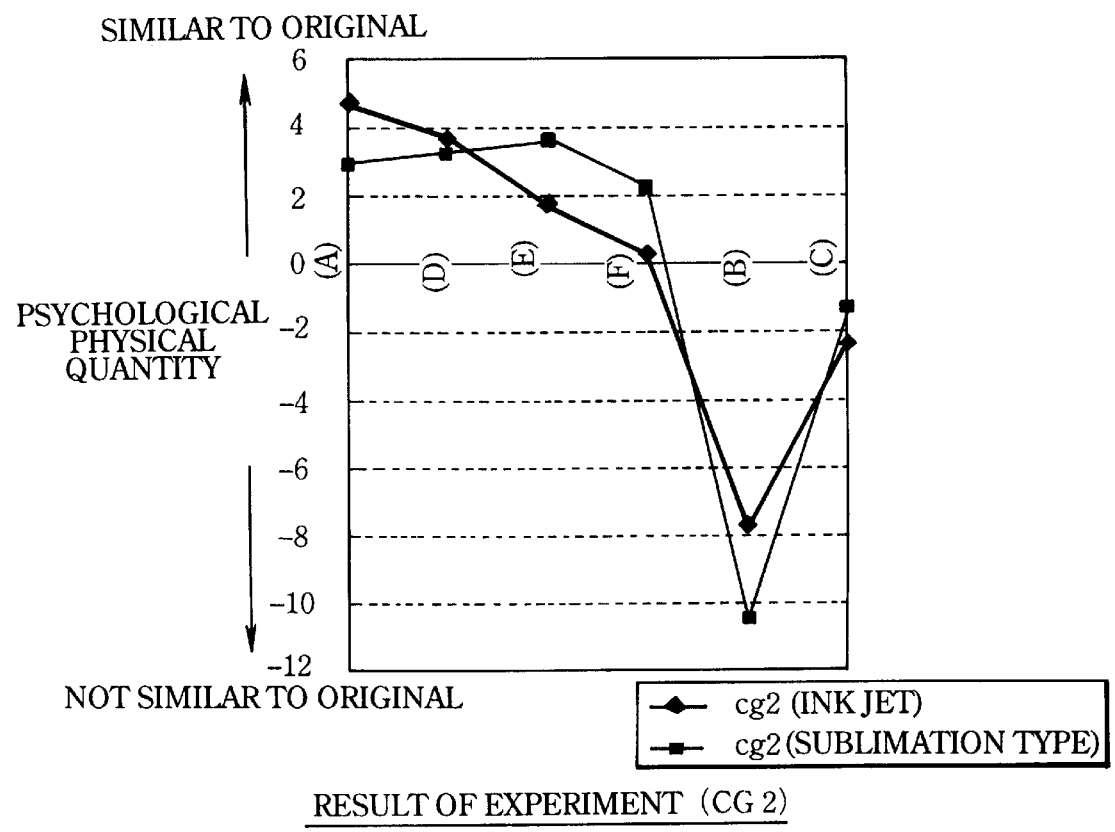
FIG. 13 is a graph showing further results of a visual sense test for comparing the other example of the color gamut compression processing by the color gamut compression processor and various techniques by the conventional chroma compression method.

The results obtained by the visual sense test are shown in FIGS. 12 and 13, in which the abscissa denotes the difference in the gamut compression techniques employed and the ordinate denotes the physico-psychological quantities. The larger the values of the physico-psychological quantities, the more the image on the light box is alike the image on the monitor.

The results indicate that the techniques (E) and (F) are preferred for CG1 and the techniques (A), (D) and (F) are preferred for CG2.

With the gamut compression method of the present invention, if the gamut of the output system is smaller than that of the input system, the gamut of the input system is divided into four portions in a two-dimensional plane of lightness and chroma, under a constant color hue, using two straight line segments, and gamut compression is done by varying the compressing direction for each area, for converting the color in the gamut of the input system into the color in the gamut of the output system, so that gamut compression can be done for realization of a more natural-looking image.

Moreover, with the gamut compression method according to the present invention, the gradient of the two straight line segments can be varied by setting a parameter for setting the direction of compression from area to area. Thus, if the present method is applied to the color DTP system, gamut compression can be achieved while more natural-looking color reproducibility is maintained in consideration of the difference in the gamut of the input device and that of the output device.

With the gamut compression method according to the present invention, in which, in a two-dimensional plane of lightness $L^*$ and chroma $C^*$ of color picture data in the CIE/$L^*$ $C^*$ h color space, under a constant color phase h, the color of the input system is divided into four areas by a first straight line segment traversing the minimum value $L^*\_min$ of lightness $L^*$ of the gamut of the output system and a second straight line segment traversing the maximum value $L^*\_max$ of lightness $L^*$ of the gamut of the output system and intersecting the first straight line segment at a point ($C^*\_th$, $L^*$ th) on a lightness value $L^*\_th$ having the maximum chroma value of $C^*\_max$ in the gamut of the output system, wherein the color of the first area above said first straight line segment and below the second straight line segment is left as is, the color of the second area lying above the first and second straight line segments is compressed in the direction of a point (0, $L^*\_min$), the color of the third area lying below the first and second straight line segments is compressed in the direction of a point (0, $L^*\_max$) and the color of the fourth area lying below the first straight line segment and above the second straight line segment is compressed in the direction of a point ($C^*\_th$, $L^*\_th$), compression may be achieved in such a manner that chroma will be maintained as far as possible in the high lightness area, that is in the second area, and in the low lightness area, that is in the third area, and in such a manner that gradation will be maintained to a certain extent in the high chroma area, that is in the fourth area.

Moreover, with the gamut compression method according to the present invention, in which the point ($C^*\_th$, $L^*\_th$) is moved by a parameter K given by $C^*\_th = C^*\_max \times K$, where $0 \leq K \leq 1$, the gradients of the first and second line segments can be varied for setting the compressing direction from one area to another. In addition, the lowering in the chroma direction may be minimized by increasing the parameter K, while the variation in the lightness direction may be reduced and gradation in the high chroma area may be improved by decreasing the value of K.

Moreover, with the gamut compression method according to the present invention, in which the value of the color picture data prior to gamut compression is set to ($L^*\_in$, $C^*\_in$, $h\_in$), and the value of the color picture data subsequent to gamut compression is set to ($L^*\_out$, $C^*\_out$, $h\_out$), compression is done in the second area in a direction of a point ($L^*\_min$, 0, $h\_in$) which will give $L^*\_out = L^*\_tmp + (L^*\_p - L^*\_tmp)/(L^*\_m - L^*\_tmp) \times L^*\_in$ $C^*\_out = C^*\_tmp + (C^*\_p - C^*\_tmp)/(C^*\_m - C^*\_tmp) \times C^*\_in$ $h\_out = h\_in$ where the maximum values of the gamut of the input system and the output system on a straight line segment traversing two points of ($L^*\_min$, 0, $h\_in$), ($L^*\_in$, $C^*\_in$, $h\_in$) are ($L^*\_m$, $C^*\_m$ h in) and ($L^*\_p$, $C^*\_p$ $h\_in$) and the values of the threshold with the first area are ($L^*\_tmp$, $C^*\_tmp$, $h\_in$), compression is done in the third area in a direction of a point ($L^*\_max$, 0, $h\_in$) which will give $L^*\_out = L^*\_tmp + (L^*\_p - L^*\_tmp)/(L^*\_m - L^*\_tmp) \times L^*\_in$ $C^*\_out = C^*\_tmp + (C^*\_p - C^*\_tmp)/(C^*\_m - C^*\_tmp) \times C^*\_in$ $h\_out = h\_in$ where the maximum values of the gamut of the input system and the output system on a straight line traversing two points of ($L^*$ max, 0, $h\_in$), ($L^*\_in$, $C^*\_in$, $h\_in$) are ($L^*\_m$, $C^*\_m$ $h\_in$) and ($L^*\_p$, $C^*\_p$ $h\_in$) and the values of the threshold with the first area are ($L^*\_tmp$, $C^*$ tmp, $h\_in$); and compression is done in said fourth area in a direction of a point ($L^*\_th$, $C^*\_th$, $h\_in$) which will give $L^*\_out = L^*\_th + (L^*\_p - L^*\_l\ th)/(L^*\_m - L^*\_th) \times L^*\_in$ $C^*\_out = C^*\_th + (C^*\_p - C^*\_l\ th)/(C^*\_m - C^*\_th) \times C^*\_in$ $h\_out = h\_in$ where the maximum values of the gamut of the input system and the output system on a straight line segment traversing two points of ($L^*\_th$, $C^*\_th$, $h\_in$), ($L^*\_in$, $C^*\_in$, $h\_in$) are ($L^*\_m$, $C^*$ m, $h\_in$) and ($L^*\_p$, $C^*\_p'h\_in$). The result is that compression may be achieved in such a manner that chroma will be maintained as far as possible in the high lightness area, that is in the second area, and in the low lightness area, that is in the third area, and in such a manner that gradation will be maintained to a certain extent in the high chroma area, that is in the fourth area. Moreover, there is no discontinuity in the threshold area produced by area division. Thus, for a color DPT system, gamut compression can be done in the CIE/$L^*$ $C^*$ h color space as the common color space while color reproducibility is maintained.

Moreover, with the gamut compression method according to the present invention, in which the value of the color picture data prior to gamut compression is set to ($L^*\_in$, $C^*\_in$, $h\_in$), and the value of the color picture data subsequent to gamut compression is set to ($L^*\_out$, $C^*\_out$, $h\_out$), compression is done in the second area in a direction of a point ($L^*\_min$, 0, $h\_in$) which will give $L^*\_out = L^*\_p$
$C^*\_out = C^*\_p$
$h\_out = h\_in$ where the maximum values of the gamut of the output system for an area outside the gamut of the output system on a straight line segment traversing two points $(L^*\_min, 0, h\_in)$, $(L^*\_in, C^*\_in, h\_in)$ are $(L^*\_p, C^*\_p, h\_in)$, compression is done in the third area in a direction of a point $(L^*\_max, 0, h\_in)$ which will give $$L^*\_out=L^*\_p$$
$$C^*\_out=C^*\_p$$
$$h\_out=h\_in$$

where the maximum values of the gamut of the output system for an area outside the gamut of the output system on a straight line segment traversing two points $(L^*\_max, 0, h\_in)$, $(L^*\_in, C^*\_in, h\_in)$ are $(L^*\_p, C^*\_p, h\_in)$; and compression is done in the fourth area in a direction of a point $(L^*\_th, C^*\_th, h\_in)$ which will give $$L^*\_out=L^*\_p$$
$$C^*\_out=C^*\_p$$
$$h\_out=h\_in$$

where the maximum values of the gamut of the output system for an area outside the gamut of the output system on a straight line segment traversing two points $(L^*\_th, C^*\_th, h\_in)$, $(L^*\_in, C^*$ in, $h\_in)$ are $(L^*\_p, C^*\_p, h\_in)$. The result is that compression may be achieved in such a manner that chroma will be maintained as far as possible in the high lightness area, that is in the second area, and in the low lightness area, that is in the third area, and in such a manner that gradation will be maintained to a certain extent in the high chroma area, that is in the fourth area. Moreover, there is no discontinuity in the threshold area produced by area division. Thus, for a color DPT system, gamut compression can be done in the CIE/L* C* h color space as the common color space while color reproducibility is maintained.

A gamut compression apparatus according to the present invention has area discrimination means for discriminating to which one of four areas obtained when dividing the gamut of an input system in a two-dimensional plane of lightness and chroma under a constant color phase, using two straight line segments, belongs an input color picture, and gamut compression means for carrying out gamut compression of converting the color outside the gamut of an output system into the color inside the gamut of the output system as the compressing direction is varied from area to area based on area discrimination by said area discrimination means. The result is that the colors in the gamut of the input system can be converted into those in the gamut of the output system, in case the gamut of the output system is smaller than that of the input system, by way of gamut compression, in such a manner as to produce a more natural-looking image.

With the gamut compression apparatus according to the present invention, the area discrimination means judges to which of the four areas of the gamut of the input system divided by a first straight line segment traversing the minimum value $L^*\_min$ of lightness $L^*$ of the gamut of the output system and a second straight line segment traversing the maximum value $L^*\_max$ of lightness $L^*$ of the gamut of the output system, intersecting the first straight line segment at a point $(C^*\_th, L^*\_th)$ on a lightness value $L^*\_th$ having the maximum chroma value of $C^*\_max$ in the gamut of the output system, belongs color data of the CIE/L* C* h color space in a two-dimensional plane of lightness L* and chroma C*, under a constant color phase h, wherein the gamut compression means carries out gamut compression based on the results of discrimination by the area discriminating means so that the color of the first area above the first straight line segment and below the second straight line segment is left as is, the color of the second area lying above the first and second straight line segments is compressed in the direction of a point $(0, L^*\_min)$, the color of the third area lying below the first and second straight line segments is compressed in the direction of a point $(0, L^*\_max)$ and the color of the fourth area lying below the first straight line segment and above the second straight line segment is compressed in the direction of a point $(C^*\_th, L^*\_th)$. The result is that compression may be achieved in such a manner that chroma will be maintained as far as possible in the high lightness area, that is in the second area, and in the low lightness area, that is in the third area, and in such a manner that gradation will be maintained to a certain extent in the high chroma area, that is in the fourth area.

With the gamut compression apparatus according to the present invention, the value of the color picture data prior to gamut compression is set to $(L^*\_in, C^*\_in, h\_in)$, and the value of the color picture data subsequent to gamut compression is set to $(L^*$ out, $C^*\_out, h\_out)$, compression is done in the second area in a direction of a point $(L^*\_min, 0, h\_in)$ which will give $$L^*\_out=L^*\_tmp+(L^*\_p-L^*\_tmp)/(L^*\_m-L^*\_tmp) \times L^*\_in$$

$$C^*\_out=C^*\_tmp+(C^*\_p-C^*\_tmp)/(C^*\_m-C^*\_tmp) \times C^*\_in$$

$$h\_out=h\_in$$

where the maximum values of the gamut of the input system and the output system on a straight line segment traversing two points of $(L^*\_max, 0, h\_in)$, $(L^*\_in, C^*\_in, h\_in)$ are $(L^*\_m, C^*\_m, h\ in)$ and $(L^*\_p, C^*\_p, h\_in)$ and the values of the threshold with the first area are $(L^*\_tmp, C^*\_tmp, h\_in)$, compression is done in the third area in a direction of a point $(L^*\_max, 0, h\_in)$ which will give $$L^*\_out=L^*\_tmp-(L^*\_p-L^*\_tmp)/(L^*\_m-L^*\_tmp) \times L^*\_in$$

$$C^*\_out=C^*\_tmp+(C^*\_p-C^*\_tmp)/(C^*\_m-C^*\_tmp) \times C^*\_in$$

$$h\_out=h\_in$$

where the maximum values of the gamut of the input system and the output system on a straight line segment traversing two points of $(L^*\_max, 0, h\_in)$, $(L^*\_in, C^*\_in, h\_in)$ are $(L^*\_m, C^*\_m, h\ in)$ and $(L^*\_p, C^*\_p, h\_in)$ and the values of the threshold with the first area are $(L^*\_tmp, C^*\_tmp, h\_in)$, compression is done in the fourth area in a direction of a point $(L^*\_th, C^*\_th, h\_in)$ which will give $$L^*\_out=L^*\_th+(L^*\_p-L^*\_l\ th)/(L^*\_m-L^*\_th) \times L^*\_in$$

$$C^*\_out=C^*\_th+(C^*\_p-C^*\_l\ th)/(C^*\_m-C^*\_th) \times C^*\_in$$

$$h\_out=h\_in$$

where the maximum values of the gamut of the input system and the output system on a straight line traversing two points of $(L^*\_th, C^*\_th, h\_in)$, $(L^*\_in, C^*\_in, h\_in)$ are $(L^*\_m, C^*\_m, h\_in)$ and $(L^*\_p, C^*\_p, h\_in)$. The result is that compression may be achieved in such a manner that chroma will be maintained as far as possible in the high lightness area, that is in the second area, and in the low lightness area, that is in the third area, and in such a manner that gradation will be maintained to a certain extent in the high chroma area, that is in the fourth area. Moreover, there is no discontinuity in the threshold area produced by area division. Thus, for a color DPT system, gamut compression can be done in the CIE/L* C* h color space as the common color space while color reproducibility is maintained. With the gamut compression apparatus according to the present invention, the value of the color picture data prior to gamut compression is set to (L* in, C*__in, h__in), and the value of the color picture data subsequent to gamut compression is set to (L*__out, C*__out, h out), compression is done in the second area in a direction of a point (L*__min, 0, h__in) which will give L*__out=L*__p
C*__out=C*__p
h__out=h__in where the maximum values of the gamut of the output system for an area outside the gamut of the output system on a straight line segment traversing two points (L*__min, 0, h__in), (L*__in, C*__in, h__in) are (L*__p, C*__p, h__in), compression is done in the third area in a direction of a point (L* max, 0, h__in) which will give L*__out=L*__p
C*__out=C*__p
h__out=h__in where the maximum values of the gamut of the output system for an area outside the gamut of the output system on a straight line segment traversing two points (L*__max, 0, h__in), (L*__in, C*__in, h__in) are (L*__p, C*__p, h__in), and compression is done in the fourth area in a direction of a point (L*__th, C*__th, h__in) which will give L*__out=L*__p
C*__out=C*__p
h__out=h__in where the maximum values of the gamut of the output system for an area outside the gamut of the output system on a straight line segment traversing two points (L*__th, C*__th, h__in), (L*__in, C* in, h__in) are (L*__p, C*__p, h__in). The result is that compression may be achieved in such a manner that chroma will be maintained as far as possible in the high lightness area, that is in the second area, and in the low lightness area, that is in the third area, and in such a manner that gradation will be maintained to a certain extent in the high chroma area, that is in the fourth area. Moreover, there is no discontinuity in the threshold area produced by area division. Thus, for a color DPT system, gamut compression can be done in the CIE/L* C* h color space as the common color space while color reproducibility is maintained.

We claim:

1. A method for gamut compression comprising the steps of:

comparing the gamut of an output system with a gamut of an input system to determine if the gamut of the output system is smaller than that of the input system;

dividing the gamut of the input system into four areas in a two-dimensional plane of lightness and chroma, under a constant color hue, using two straight line segments, if the gamut of the output system is smaller than that of the input system; and conducting gamut compression by varying the compressing direction for each area obtained in the dividing step to convert the color in the gamut of the input system into the color in the gamut of the output system.

2. The method for gamut compression as claimed in claim 1 wherein a parameter is determined for varying the gradient of said two straight line segments for setting the compressing direction from one area to another.

3. The method for gamut compression as claimed in claim 1 wherein, in a two-dimensional plane of lightness L* and chroma C* of color picture data in the CIE/L* C* h color space, under a constant color phase h, the color of the input system is divided into four areas by a first straight line segment traversing the minimum value L*__min of lightness L* of the gamut of the output system and a second straight line segment traversing the maximum value L*__max of lightness L* of the gamut of the output system, said first and second straight line segments intersecting each other at a point (C*__th, L*__th) on a lightness value L*__th having he maximum chroma value of C*__max in the gamut of the output system;

the color of the first area above said first straight line segment and below the second straight line segment is left as is;

the color of the second area lying above the first and second straight line segments is compressed in the direction of a point (0, L*__min);

the color of the third area lying below the first and second straight line segments is compressed in the direction of a point (0, L*__max); and the color of the fourth area lying below the first straight line segment and above the second straight line segment is compressed in the direction of a point (C*__th, L*__th).

4. The method for gamut compression as claimed in claim 3 wherein the point (C*__th, L*__th) is moved by a parameter K given by C*__th=C*__max×K, where $0 \leq K \leq 1$, for varying the gradient of each of the first and second straight line segments for setting the compressing direction from one area to another.

5. The method for gamut compression as claimed in claim 3 wherein the value of the color picture data prior to gamut compression is set to (L*__in, C*__in, h__in), and the value of the color picture data subsequent to gamut compression is set to (L* out, C*__out, h__out);

compression is done in said second area in a direction of a point (L*__min, 0, h__in) which will give L*__out=L*__tmp+(L*__p−L*__tmp)/(L*__m−L*__tmp)×L*__in C*__out=C*__tmp+(C*__p−C*__tmp)/(C*__m−C*__tmp)×C*__in h__out=h__in where the maximum values of the gamut of the input system and the output system on a straight line segment traversing two points of (L*__min, 0, h__in), (L*__in, C*__in, h__in) are (L*__m, C*__m h in) and (L*__p, C*__p h__in) and the values of the threshold with the first area are (L*__tmp, C*__tmp, h__in);

compression is done in said third area in a direction of a point (L*__max, 0, h__in) which will give L*__out=L*__tmp+(L*__p−L*__tmp)/(L*__m−L* tmp)×L*__in C*__out=CL tmp+(C*__p−C*__tmp)/(C*__m−C*__tmp)×C*__in h__out=h__in where the maximum values of the gamut of the input system and the output system on a straight line traversing two points of (L* max, 0, h_in), (L*_in, C*_in, h_in) are (L*_m, C*_m, h_in) and (L*_p, C*_p h_in) and the values of the threshold with the first area are (L*_tmp, C*_tmp, h_in); and compression is done in said fourth area in a direction of a point (L*_th, C*_th, h_in) which will give $$L^*\_out = L^*\_th + (L^*\_p - L^*\_th)/(L^*\_m - L^*\_th) \times L^*\_in$$

$$C^*\_out = C^*\_th + (C^*\_p - C^*\_th)/(C^*\_m - C^*\_th) \times C^*\_in$$

$$h\_out = h\_in$$

where the maximum values of the gamut of the input system and the output system on a straight line segment traversing two points of (L*_th, C*_th, h_in), (L*_in, C*_in, h_in) are (L*_m, C*_m, h in) and (L*_p, C*_p h_in).

6. The method for gamut compression as claimed in claim 3 wherein the value of the color picture data prior to gamut compression is set to (L*_in, C*_in, h_in), and the value of the color picture data subsequent to gamut compression is set to (L*_out, C* out, h_out), compression is done in said second area in a direction of a point (L*_min, 0, h_in) which will give
L*_out=L*_p
C*_out=C*_p
h_out=h_in where the maximum values of the gamut of the output system for an area outside the gamut of the output system on a straight line segment traversing two points (L*_min, 0, h_in), (L*_in, C*_in, h_in) are (L*_p, C*_p, h_in);

compression is done in said third area in a direction of a point (L*_max, 0, h_in) which will give
L*_out=L*_p
C*_out=C*_p
h_out=h_in where the maximum values of the gamut of the output system for an area outside the gamut of the output system on a straight line segment traversing two points (L*_max, 0, h_in), (L*_in, C*_in, h_in) are (L*_p, C*_p, h_in); and compression is done in said fourth area in a direction of a point (L*_th, C*_th, h_in) which will give
L*_out=L*_p
C*_out=C*_p
h_out=h_in where the maximum values of the gamut of the output system for an area outside the gamut of the output system on a straight line segment traversing two points (L*_th, C*_th, h_in), (L*_in, C* in, h_in) are (L*_p, C*_p, h_in).

7. The method for gamut compression as claimed in claim 3 wherein the value of the color picture data prior to gamut compression is set to (L*_in, C*_in, h_in), and the value of the color picture data subsequent to gamut compression is set to (L* out, C*_out, h_out);

compression is done in said second area in a direction of a point (L*_min, 0, h_in) which will give $$L^*\_out = L^*\_tmp + (L^*\_p - L^*\_tmp)/(L^*\_m - L^*\_tmp) \times L^*\_in$$

$$C^*\_out = C^*\_tmp + (C^*\_p - C^*\_tmp)/(C^*\_m - C^*\_tmp) \times C^*\_in$$

$$h\_out = h\_in$$

where the maximum values of the gamut of the input system and the output system on a straight line segment traversing two points of (L*_min, 0, h_in), (L*_in, C*_in, h_in) are (L*_m, C*_m, h in) and (L*_p, C*_p h_in) and the values of the threshold with the first area are (L*_tmp, C*_tmp, h_in);

compression is done in said third area in a direction of a point (L*+max, 0, h_in) which will give $$L^*\_out = L^*\_tmp - (L^*\_p - L^*\_tmp)/(L^*\_m - L^*\_tmp) \times L^*\_in$$

$$C^*\_out = C^*\_tmp + (C^*\_p - C^*\_tmp)/(C^*\_m - C^*\_tmp) \times C^*\_in$$

$$h\_out = h\_in$$

where the maximum values of the gamut of the input system and the output system on a straight line segment traversing two points of (L*_max, 0, h_in), (L*_in, C*_in, h_in) are (L*_m, C*_m, h in) and (L*_p, C*_p, h_in) and the values of the threshold with the first area are (L*_tmp, C*_tmp, h_in);

compression is done in said fourth area in a direction of a point (L*_th, C*_th, h_in) which will give $$L^*\_out\ L^*\_th + (L^*\_p - L^*\_th)/(L^*\_m - L^*\_th) \times L^*\_in$$

$$C^*\_out = C^*\_th + (C^*\_p - C^*\_th)/(C^*\_m - C^*\_th) \times C^*\_in$$

$$h\_out = h\_in$$

where the maximum values of the gamut of the input system and the output system on a straight line traversing two points of (L* th, C*_th, h_in), (L*_in, C*_in, h_in) are (L*_m, C*_m, h_in) and (L*_p, C*_p, h_in).

8. An apparatus for color gamut compression, comprising:

area discrimination means for determining to which one of four areas an input color plate belongs, the four areas being obtained by dividing the gamut of an input system in a two-dimensional plate of lightness and chroma under a constant color phase using two straight line segments; and gamut compression means for carrying out gamut compression by converting the color outside the gamut of an output system into the color inside the gamut of the output system as the compressing direction is varied in each area of the gamut of the input system based on the area discrimination by said area discrimination means.

9. The apparatus for gamut compression as claimed in claim 8 wherein said area discrimination means judges to which of the four areas of the gamut of the input system divided by a first straight line segment traversing the minimum value L*_min of lightness L* of the gamut of the output system and a second straight line segment traversing the maximum value L*_max of lightness L* of the gamut of the output system belongs color picture data in the CIE/L*C*h color space, said first and second straight line segments intersecting each other at a point (C*_th, L*_th) on a lightness value L*_th having the maximum chroma value of C*_max in the gamut of the output system, in a two-dimensional plane of lightness L* and chroma C*, under a constant color phase h; and wherein said gamut compression means carrying out gamut compression based on the results of discrimination by said area discriminating means so that the color of the first area above said first straight line segment and below the second straight line segment is left as is, the color of the second area lying above the first and second straight line segments is compressed in the direction of a point (0, L*_min), the color of the third area lying below the first and second straight line segments is compressed in the direction of a point (0, $L^*\_max$); and the color of the fourth area lying below the first straight line segment and above the second straight line segment is compressed in the direction of a point ($C^*\_th, L^*\_th$).

10. The apparatus as claimed in claim 9 wherein the value of the color picture data prior to gamut compression is set to ($L^*\_in, C^*\_in, h\_in$), and the value of the color picture data subsequent to gamut compression is set to ($L^*\_out, C^*$ out, $h\_out$), compression is done in said second area in a direction of a point ($L^*\_min, 0, h\_in$) which will give $L^*\_out=L^*\_p$
$C^*\_out=C^*\_p$
$h\_out=h\_in$ where the maximum values of the gamut of the output system for an area outside the gamut of the output system on a straight line segment traversing two points ($L^*\_min, 0, h\_in$), ($L^*\_in, C^*\_in, h\_in$) are ($L^*\_p, C^*\_p, h\_in$);

compression is done in said third area in a direction of a point ($L^*\_max, 0, h\_in$) which will give $L^*\_out=L^*\_p$
$C^*\_out=C^*$ p
$h\_out=h\_in$ where the maximum values of the gamut of the output system for an area outside the gamut of the output system on a straight line segment traversing two points ($L^*\_max, 0, h\_in$), ($L^*\_in, C^*\_in, h\_in$) are ($L^*\_p, C^*\_p, h\_in$); and compression is done in said fourth area in a direction of a point ($L^*\_th, C^*\_th, h\_in$) which will give $L^*\_out=L^*\_p$
$C^*\_out=C^*\_p$
$h\_out=h\_in$ where the maximum values of the gamut of the output system for an area outside the gamut of the output system on a straight line segment traversing two points ($L^*$ th, $C^*\_th, h\_in$), ($L^*\_in, C^*$ in, $h\_in$) are ($L^*\_p, C^*\_p, h\_in$).

* * * * *

UNITED STATES PATENT AND TRADEMARK OFFICE
CERTIFICATE OF CORRECTION

PATENT NO. : 5,933,253
DATED : August 3, 1999
INVENTOR(S) : Masahiko Ito et al.

It is certified that error appears in the above-identified patent and that said Letters Patent is hereby corrected as shown below:

<u>Column 12,</u>
Line 7 et seq., Claim 3 in its entirety should read as follows:

3. A method for gamut compression comprising the steps of:
comparing the gamut of an output system with a gamut of an input system to determine if the gamut of the output system is smaller than that of the input system;

dividing the gamut of the input system into four areas in a two-dimensional plane of lightness and chroma, under a constant color hue, using two straight line segments, if the gamut of the output system is smaller than that of the input system; and conducting gamut compression by varying the compressing direction for each area obtained in the dividing step to convert the color in the gamut of the input system into the color in the gamut of the output system, wherein, in a two-dimensional plane of lightness $L^*$ and chroma $C^*$ of color picture data in the CIE/$L^*$ $C^*$ h color space, under a constant color phase h, the color of the input system is divided into four areas by a first straight line segment traversing the minimum value $L^*\_min$ of lightness $L^*$ of the gamut of the output system and a second straight line segment traversing the maximum value $L^*\_max$ of lightness $L^*$ of the gamut of the output system, said first and second straight line segments intersecting each other at a point ($C^*\_th, L^*\_th$) on a lightness value $L^*\_th$ having the maximum chroma value of $C^*\_max$ in the gamut of the output system, the color of the first area above said first straight line segment and below the second straight line segment is left as is, the color of the second area lying above the first and second straight line segments is compressed in the direction of a point (0, $L^*\_min$), the color of the third area lying below the first and second straight line segments is compressed in the direction of a point (0, $L^*\_max$), and the color of the fourth area. lying below the first straight line segment and above the second straight line segment is compressed in the direction of a point ($C^*\_th, L^*\_th$).

UNITED STATES PATENT AND TRADEMARK OFFICE
CERTIFICATE OF CORRECTION

PATENT NO. : 5,933,253
DATED : August 3, 1999
INVENTOR(S) : Masahiko Ito et al.

It is certified that error appears in the above-identified patent and that said Letters Patent is hereby corrected as shown below:

Column 13,
Line 50 et seq., claim 6, should read; ($L^*\_th$, $C^*\_th$, $h\_in$), ($L^*\_in$, $C^*\_th$, $h\_in$) are ($L^*\_p$, $C^*\_p$, $h\_in$).

Column 14,
Line 22, claim 7, should read; $L^*\_out = L^*\_th + (L^*\_p - th)/(L^*\_m - L^*\_th) \times L^*in$
Line 33 et seq., claim 9, should read;

9. An apparatus for color gamut compression, comprising:
area discrimination means for determining to which one of four areas an input color plate belongs, the four areas being obtained by dividing the gamut of an input system in a two-dimensional plate of lightness and chroma under a constant color phase using two straight line segments; and
  gamut compression means for carrying out gamut compression by converting the color outside the gamut of an output system into the color inside the gamut of the output system as the compressing direction is varied in each area of the gamut of the input system based on the area discrimination by said area discrimination means,
    wherein said area discrimination means judges to which of the four areas of the gamut of the input system divided by a first straight line segment traversing the minimum value $L^*\_min$ of lightness $L^*$ of the gamut of the output system and a second straight line segment traversing the maximum value $L^*\_max$ of lightness $L^*$ of-the gamut of the output system belongs color picture data in the CIE/$L^*C^*h$ color space, said first and second straight line segments intersecting each other at a point ($C^*\_th$, $L^*\_th$) on a lightness value $L^*\_th$ having the maximum chroma value of $C^*\_max$ in the gamut of the output system, in a two-dimensional plane of lightness $L^*$ and chroma $C^*$, under a constant color phase h, and

UNITED STATES PATENT AND TRADEMARK OFFICE
CERTIFICATE OF CORRECTION

PATENT NO. : 5,933,253
DATED : August 3, 1999
INVENTOR(S) : Masahiko Ito et al.

It is certified that error appears in the above-identified patent and that said Letters Patent is hereby corrected as shown below:

wherein said gamut compression means carrying out gamut compression based on the results of discrimination by said area discriminating means so that the color of the first area above said first straight line segment and below the second straight line segment is left as is, the color of the second area lying above the first and second straight line segments is compressed in the direction of a point $(0, L^*\_min)$, the color of the third area lying below the first and second straight line segments is compressed in the direction of a point $(0, L^*\_max)$; and the color of the fourth area lying below the first straight line segment and above the second straight line segment is compressed in the direction of a point $(C^*\_th, L^*\_th)$.

Signed and Sealed this

Eighteenth Day of September, 2001

*Attest:*

*Attesting Officer*

NICHOLAS P. GODICI
*Acting Director of the United States Patent and Trademark Office*